(12) United States Patent
Noll et al.

(10) Patent No.: US 11,693,876 B2
(45) Date of Patent: Jul. 4, 2023

(54) EFFICIENT SHARED BULK LOADING INTO OPTIMIZED STORAGE

(71) Applicant: SAP SE, Walldorf (DE)

(72) Inventors: Stefan Noll, Sandhausen (DE); Jens Teubner, Dortmund (DE); Norman May, Karlsruhe (DE); Alexander Boehm, Schwetzingen (DE)

(73) Assignee: SAP SE, Walldorf (DE)

( * ) Notice: Subject to any disclaimer, the term of this patent is extended or adjusted under 35 U.S.C. 154(b) by 27 days.

(21) Appl. No.: 16/739,352

(22) Filed: Jan. 10, 2020

(65) Prior Publication Data

US 2021/0216564 A1   Jul. 15, 2021

(51) Int. Cl.
*G06F 16/25* (2019.01)
*G06F 16/23* (2019.01)

(52) U.S. Cl.
CPC ........ *G06F 16/254* (2019.01); *G06F 16/2365* (2019.01); *G06F 16/258* (2019.01)

(58) Field of Classification Search
CPC ...... G06F 3/065; G06F 11/368; G06F 16/254; G06F 16/258; G06F 16/2365
See application file for complete search history.

(56) References Cited

U.S. PATENT DOCUMENTS

| | | | |
|---|---|---|---|
| 8,935,205 B2 | 1/2015 | Hildenbrand et al. |
| 9,152,626 B2 | 10/2015 | Seufert et al. |
| 9,189,520 B2 | 11/2015 | May et al. |
| 9,329,899 B2 | 5/2016 | Ailamaki et al. |
| 9,378,233 B2 | 6/2016 | Lee et al. |
| 9,454,571 B2 | 9/2016 | Grosse et al. |
| 9,720,942 B2 | 8/2017 | Kaufmann et al. |
| 9,983,903 B2 | 5/2018 | Ailamaki et al. |
| 10,061,808 B2 | 8/2018 | Kim et al. |
| 10,185,744 B2 | 1/2019 | Bensberg et al. |
| 10,248,688 B2 | 4/2019 | Grosse et al. |
| 10,261,950 B2 | 4/2019 | Lee et al. |

(Continued)

FOREIGN PATENT DOCUMENTS

EP   3171271   5/2017

OTHER PUBLICATIONS

U.S. Appl. No. 16/373,859, filed Apr. 3, 2019, Kroll et al.

(Continued)

*Primary Examiner* — Amresh Singh
*Assistant Examiner* — Courtney Harmon
(74) *Attorney, Agent, or Firm* — Fish & Richardson P.C.

(57) ABSTRACT

The present disclosure involves systems, software, and computer implemented methods for efficient shared bulk loading into optimized storage. One example method includes identifying a data set on a client to load to a server. Load steps that can be performed either on the client or the server are identified. Values for load factors are determined. Load rules are determined that are based on load factors and are for determining processing locations for the load steps. A processing location of either the client or the server is determined for each load step, based on the load rules. Load steps that have a processing location of the client are executed on the data set, on the client. The data set is transferred from the client to the server, over a network. Load steps that have a processing location of the server are executed on the data set, at the server.

20 Claims, 5 Drawing Sheets

(56) References Cited

U.S. PATENT DOCUMENTS

| | | |
|---|---|---|
| 10,275,508 B2 | 4/2019 | Bensberg et al. |
| 10,282,351 B2 | 5/2019 | Bensberg et al. |
| 10,482,085 B2 | 11/2019 | Moerkotte et al. |
| 10,650,016 B2* | 5/2020 | A. C. .................... G06F 16/254 |
| 2007/0136324 A1 | 6/2007 | Xu et al. |
| 2009/0235252 A1 | 9/2009 | Weber et al. |
| 2011/0302226 A1 | 12/2011 | Abadi et al. |
| 2014/0040182 A1* | 2/2014 | Gilder .................. G06F 16/256 707/602 |
| 2014/0114728 A1 | 4/2014 | Kaufmann et al. |
| 2014/0172804 A1 | 6/2014 | Kaufmann et al. |
| 2015/0370871 A1* | 12/2015 | Bender ................ G06F 9/4881 707/602 |
| 2016/0042039 A1 | 2/2016 | Kaufmann et al. |
| 2017/0017674 A1 | 1/2017 | Scheuer et al. |
| 2017/0147628 A1 | 5/2017 | Park et al. |
| 2017/0147638 A1 | 5/2017 | Park et al. |
| 2018/0011875 A1 | 1/2018 | Bensberg et al. |
| 2018/0018375 A1 | 1/2018 | Brunel et al. |
| 2018/0018383 A1 | 1/2018 | Brunel et al. |
| 2018/0246809 A1 | 8/2018 | Rebholz et al. |
| 2018/0253473 A1 | 9/2018 | Ziegler et al. |
| 2018/0329974 A1 | 11/2018 | Bensberg et al. |
| 2018/0341678 A1 | 11/2018 | Moerkotte et al. |
| 2018/0341679 A1 | 11/2018 | Moerkotte et al. |
| 2018/0357291 A1 | 12/2018 | Choi et al. |
| 2019/0109891 A1* | 4/2019 | Paruchuri .............. H04L 29/06 |
| 2019/0130001 A1 | 5/2019 | May et al. |
| 2019/0266272 A1 | 8/2019 | Wolf et al. |
| 2019/0278608 A1 | 9/2019 | Psaropoulos et al. |
| 2019/0278858 A1 | 9/2019 | Psaropoulos et al. |
| 2019/0310943 A1 | 10/2019 | Noll et al. |
| 2019/0370257 A1 | 12/2019 | Wolf et al. |
| 2020/0127900 A1* | 4/2020 | Wright ................. G06F 9/5083 |
| 2020/0311054 A1* | 10/2020 | Hicks ................. H04L 67/1097 |
| 2021/0073743 A1* | 3/2021 | Fox .................... G06Q 10/1095 |
| 2021/0271648 A1* | 9/2021 | Arbel ..................... G06F 16/21 |

OTHER PUBLICATIONS

Extended European Search Report issued in European Application No. 20198392.1 dated Mar. 19, 2021, 12 pages.

Noll et al., "Shared Load (ing): Efficient Bulk Loading into Optimized Storage." CIDR. 2020, 10 pages.

* cited by examiner

EFFICIENT SHARED BULK LOADING INTO OPTIMIZED STORAGE

TECHNICAL FIELD

The present disclosure relates to computer-implemented methods, software, and systems for efficient shared bulk loading into optimized storage.

BACKGROUND

In today's heterogeneous system landscape, an ever-growing volume of data is available in plain text files. Plain text files can be used to transfer scientific data sets or business data, to facilitate replication and system integration, or to migrate to a new system, to name a few examples. For some database systems, text files can be bulk loaded into the database system. When text files are migrated, data may need to be transferred over a network. A network for migration can be a fast internal network, in case of a cloud-only or an on-premise scenario, or a relatively slower connection, such as an Internet connection, e.g., when loading data from an on-premise setup into the cloud.

SUMMARY

The present disclosure involves systems, software, and computer implemented methods for efficient shared bulk loading into optimized storage. One example method includes: identifying at least one load processing step to be performed on the data set that can be performed either on the client device or at the server database system; determining values for at least one load processing factor that can be used to determine whether to perform a given load processing step on the client device or at the server database system; identifying at least one load processing rule for determining a processing location for a given load processing step, wherein each load processing rule is based on at least one load processing factor; determining, based on the at least one load processing rule and for each respective identified load processing step, a processing location of either the client device or the server database system, for performing the load processing step; when at least one load processing step has a processing location of the client device, performing the load processing steps that have a processing location of the client device, on the data set, on the client device; transferring the data set from the client device to the server, over a network; and when at least one load processing step has a processing location of the database server system, performing the load processing steps that have a processing location of the database server system, on the data set, at the database server system.

Implementations may include one or more of the following features. At least one server-side processing step, can be performed on the data set, independent of the at least one load processing rule. The at least one server-side processing step can include an authorization step, a uniqueness check, or a data consistency check. The data set can be loaded into a database of the database server system. The load processing steps can include transformation to a target format. Transformations can include deserialization, compression, sorting, or merging. The load processing factors can include network load, server load, client load, data set size, data set format, or data set target format. Determining a processing location for a given load processing step can be performed at the client device. The client device can determine a processing location for the given load processing step based at least in part on data received from the database server system. Determining a processing location for a given load processing step can be performed at the database server system. The database server system can determine a processing location for the given load processing step based at least in part on data received from the client device. A processing location for a given load processing step can be determined for the data set before the data set is processed. A processing location for a given load processing step can be determined for each of multiple portions of the data set. The portions can include data for a given table, a given number of records, or a given number of bytes of data.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Many systems include a data loading portion that loads data, e.g., in a textual format, from a source system into a target system. Text formats can be XML (eXtensible Markup Language), JSON (JavaScript Object Notation), CSV (Comma Separated Values), or other formats. Various types of bulk loading can be used with database systems. For example, commercial and open-source database systems can offer a range of interfaces for bulk loading files. For example, systems may offer a terminal-based front-end. A user can either manually transfer file(s) to be loaded or file(s) to be loaded can be transferred during a loading operation. As another example, systems may support parameterized SQL (Structured Query Language) queries with array bindings. Rather than submitting a query for every row of a table, parameterized queries can allow batching multiple rows in a single query. As yet another example, some vendors may provide dedicated tools for importing files. Generally, most bulk load tools at least primarily involve load processing on the server(s).

Bulk loading into an optimized storage of a database system can be a performance-critical task for data analysis, replication, and system integration. Depending on the storage layout of data on the server, bulk loading may include complex data transformations that can be resource-expensive tasks that can disturb other workloads. Bulk loading and concurrently running queries can compete for hardware resources, for example, which can result in poor loading throughput and poor query performance. Transformations may take away precious processor cycles from queries running in parallel, for example. Bulk loading, for example of text files, can quickly become a bottleneck in mission-critical migration processes. Therefore, fast and efficient bulk loading can be important.

Bulk loading processing time can include resource utilization for deserialization, for example. However, in some in-memory columnar systems with compression-optimized storage, data transformation can dominate a cost of bulk loading. For example, for modern systems that employ highly compressed storage, challenges may exist for transforming data because compression can be resource-intensive. Compression transformations may cause resource contention on a stressed system, resulting in poor and unpredictable performance for both bulk loading and query processing.

To mitigate the above mentioned problems, a shared-loading system can be used for efficient bulk loading into optimized storage. The shared-loading system can include a distributed bulk loading mechanism that enables dynamically offloading of deserialization and/or data transformation, for example, to client machine(s) where input data resides. Input data for bulk loading can often be stored at client machines and not on server machine(s) running the database system, for example. A cost analysis module of a bulk loading pipeline can dynamically identify which steps are worth offloading, such as deserialization and/or data transformation.

Shared loading can accelerate bulk loading into compression-optimized storage and improve the performance and predictability of concurrently running queries. The architecture of the shared-loading system can allow dynamically adapting of data transformations and shifting of work between client(s) and server(s) at loading time, without a need for a user to partition data or to manually parallelize bulk loading. Shared loading can increase bulk loading throughput especially in slower network environments or when the database system is stressed. Shared loading can significantly improve tail latency of a query workload to enable efficient bulk loading into compression-optimized storage without sacrificing query performance and predictability. Tail latency can be a measure of response times that take the longest in comparison to a majority of response times for a system.

Moving processing to client systems can improve scalability of a database system. Many clients can perform some load processing, for example, which can, collectively, significantly reduce a processing load on a server system. Clients may be more readily added to a system to handle increased system load, as compared to addition of server systems. An end to end system can take advantage of client-side systems sharing a processing cost by processing local content before the local content is sent to the server, as compared to sending unprocessed content to the server for server-side processing.

Figure 1:
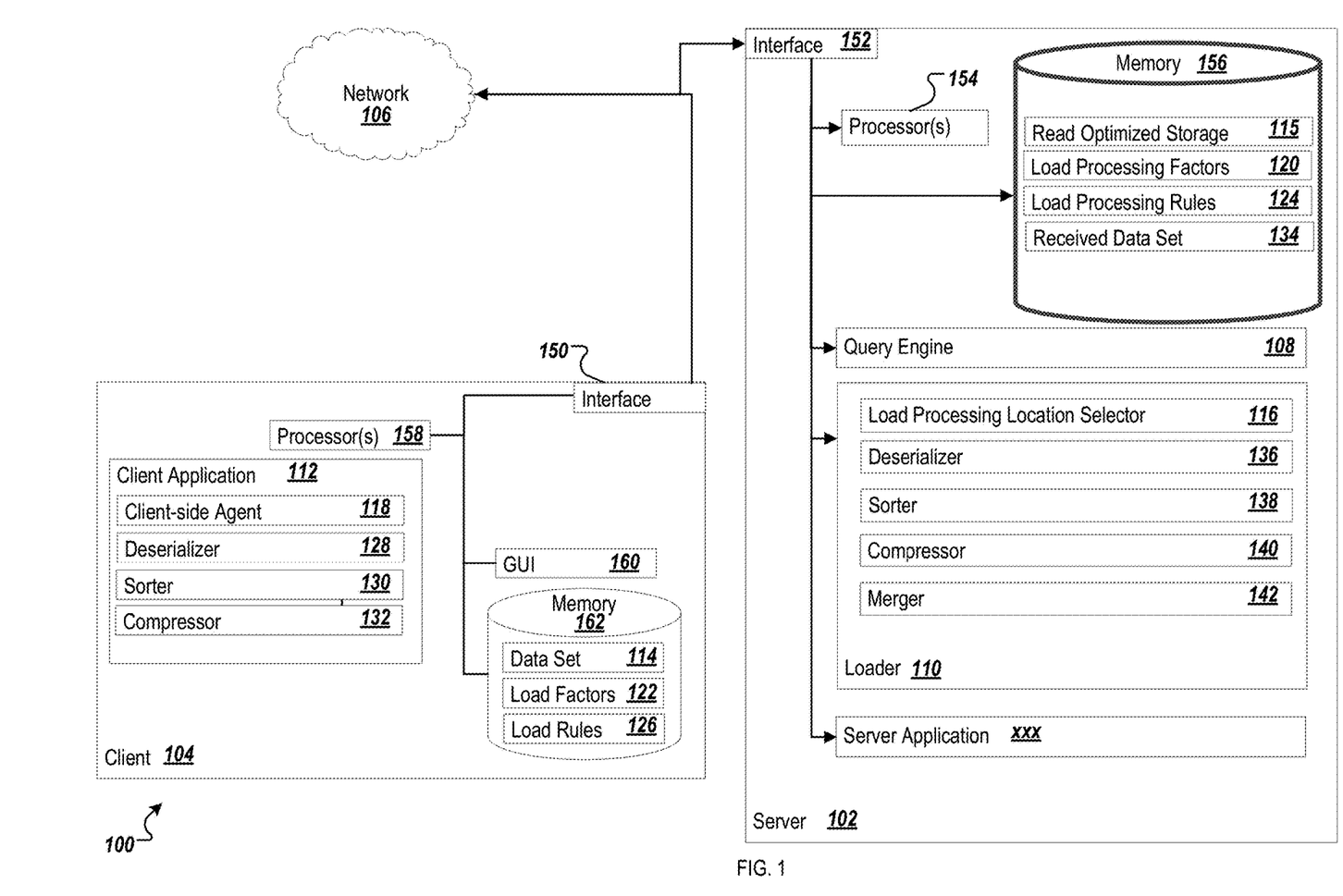
FIG. 1 is a block diagram illustrating an example system for efficient shared bulk loading into optimized storage.

FIG. 1 is a block diagram illustrating an example system 100 for efficient shared bulk loading into optimized storage. Specifically, the illustrated system 100 includes or is communicably coupled with a server 102, a client device 104, and a network 106. The server 102 can be or be associated with a database system, for example. Although shown separately, in some implementations, functionality of two or more systems or servers may be provided by a single system or server. In some implementations, the functionality of one illustrated system or server may be provided by multiple systems or servers.

As mentioned, loading can be improved by moving some loading processing previously performed on the server 102 to the client device 104. A distributed bulk loading mechanism can enable offloading of tasks such as deserialization and/or data transformation to the client device 104 (and other client devices) at loading time. Performance advantages can be leveraged, for example, when the server 102 is stressed, e.g., when a query engine 108 is running query workloads concurrently with load tasks performed by a loader 110. Offloading data transformations to the client device 104 can reduce processor contention on the server 102 which can benefit both query processing and bulk loading.

A client application 112 can determine that a data set 114 is to be sent to and loaded on the server 102. Loading requests can be initiated from client application 112 or from an end user. For instance, the client application 112 or an administrator may send a request to load data into a particular table or set of tables on the server 102. The end-user or the client application 112 can receive a schema from the server 102 that describes a structure of tables into which data is to be loaded.

A load processing pipeline for loading data to be stored on the server 102 can include a sequence of processing steps that includes location-independent steps that may be performed on either the client device 104 or on the server 102. Each processing step can produce an output that may be used as an input to a next step in the sequence. Example processing steps include deserialization, sorting, compression, or other data transformation tasks.

Deserialization can include processing a file as a sequence of characters and interpreting the sequence of characters to identify portions of the file that correspond to particular columns of table(s), for example. Interpreting can include identifying delimiters in the sequence of characters and identifying field/column boundaries. A transformation task can be performed in response to determining that a source system format is different than a target system format. An example data transformation is dictionary compression. A database, such as an in-memory database, may use digital compression for columnar data stored in read-optimized storage 115. Loaded textual data can undergo a transformation to compress the data into a compressed format used by the read-optimized storage 115. For example, an in-memory database can use order-preserving dictionary compression in the read-optimized storage 115. Other transformation tasks can include splitting data for parallel loading.

A load processing location selector 116 and/or a client-side agent 118 can determine a processing location of each of the location-independent load processing steps. For instance, the load processing location selector 116 can determine load processing factors 120 that may affect a determination of a processing location for some or all of the location-independent load processing tasks.

Some load processing factors 120 may be (relatively) static, such as client computational ability and server computational ability (e.g., where computational ability can be determined from currently-installed hardware resources (e.g., memory, processor(s)). Other load processing factors may be dynamic, such as current server load, current client load, or data that indicates a current network load of the network 106.

Some load processing factors can be derived from the data set 114. For instance, the client-side agent 118 can determine load processing factors 122, such as a size of the data set 114, or other characteristics of the data set 114. For instance, the client-side agent 118 can determine a table count, a column count, a type of data, and/or type(s) of transformation(s) that need to be performed on the data set 114. As another example, the client-side agent 118 can estimate a compression time for the data set 114, or an estimated processing cost for performing other data transformations.

As discussed in more detail below, some of the load processing factors 118 or the load processing factors 120 may be based on metrics from processing a portion of the data set 114 (e.g., on the client device 104 and/or on the server 102). For instance, a size of an output of one step may determine a processing location of a next step. As another example, performance metrics (e.g., processing time, transfer time) of performing a particular load processing task on all or a portion of the data set 114 on either the client device 104 or the server 102 may determine whether a next portion or a next processing step is handled by the client device 104 or the server 102.

In general, the load processing location selector 116 and/or the client-side agent 118 can determine processing location(s) based on load processing rules 124 or load processing rules 126, respectively. Load processing rules 124 or 126 can include logic that evaluates load processing factors 120 and/or 122 to determine a processing location for one or more load processing steps. For instance, a load processing rule 124 or 126 can include conditions that include evaluation of different load factor values to produce a decision as to which or how many load processing tasks to perform on the client device 104 or on the server 102. For example, a load processing rule 124 or 126 can include logic/decisions that result in shifting data transformations based on the server's utilization, the client's and the server's compute capabilities, or the network bandwidth, or other network properties (e.g., latency, packet loss rate, reliability of network connection).

Some load processing rules may correspond to a broad goal, such as "minimize cost," "minimize data transfer," or "minimize server load." Some load processing rules that correspond to broad goals may have other conditions. For instance, a load processing rule may include logic or conditions that correspond to "minimizing server work while server capacity is more than forty percent". As another example, a load processing rule may include logic or conditions that correspond to "minimizing data transfer size when the compression rate is at least fifty percent." For instance, if current compression tasks are reducing the size of a data transfer by at least fifty percent, the compression can continue to be performed on the client device 104, otherwise future compression can be targeted for the server 102. As another example, a number of unique values in a column can be estimated and used to estimate a total memory size of a dictionary-compressed column and a corresponding dictionary. If the memory size is estimated to be smaller than an uncompressed column, a rule can specify to transform the column at the client device 104, and to otherwise transform the column on the server 102.

The load processing rules 124 and/or the load processing rules 126 can be evaluated, to determine a load processing location for each load processing step (e.g., to determine a client/server split of tasks). In some implementations, evaluation of a load processing rule 124 or 126 may result in a score. A score may add weight to selecting a certain number or certain load processing tasks for execution on either the client device 104 or the server 102. Scores can be aggregated and aggregated scores can be used to select processing locations for the load processing tasks. In some cases, different load processing rules can have a weight factor that produces weighted scores, so that higher-weighted load processing rules factor more prominently in determining processing locations when scores are aggregated.

In some implementations, load processing rules can be in a sequence, with higher priority rules evaluated first and lower priority rules evaluated later, where evaluation of each rule can result in an absolute decision (e.g., perform certain or a certain number of tasks on the client device 104 or on the server 102) that halts evaluation of other rules in the sequence, or an output score that is aggregated with other scores from other rules in the sequence for use in an eventual decision as to which or how many tasks to perform on the client device 104 or on the server 102 (e.g., as described above).

Load processing selection can result in a processing plan that is relatively client-centric, relatively server-centric, or something in between. An extreme version of server-side processing can be to stream/send the original data set 114 to the server 102, for processing by the server 102, with no processing done on the client device 104. An extreme version of client-centric processing can be to select a processing location of the client device 104 for all location-independent load processing tasks. Regardless of which steps are performed on the client device 104, in some implementations, some load processing may always be performed on the server 102. For example, the server 102 can perform data consistency, authorization, or uniqueness checks, regardless of whether other steps were performed on the client device 104 or on the server 102.

When at least one load processing step has a processing location of the client device 104, the load processing steps that have a processing location of the client device 104 can be performed on the data set 114, on the client device 104. For example, the data set 114 (or an intermediate client data set) can be processed by one or more of a deserializer 128, a sorter 130, or a compressor 132. After processing has been performed on the client device 104, the data set 114 (or a processed version of the data set 114) can be transferred to the server 102, (e.g., as a received data set 134).

When at least one load processing step has a processing location of the server 102, the load processing steps that have a processing location of the server 102 can be performed, on the received data set 134, at the server 102. For example, the received data set 134 (or an intermediate server data set) can be processed by a deserializer 136, a sorter 138, or a compressor 140. As mentioned, some processing may always be performed on the server 102. For example, a merger 142 can merge table partitions in the received data set 134 into a complete table, to be stored in the read-optimized storage 115. The read-optimized storage 115 can include compressed data and corresponding dictionaries.

In further detail, how much load processing to offload to the client device 104 can be preconfigured and/or can be determined dynamically. For instance, more or less load processing can be performed on the client device 104, or the server 102, as client, server, and network loads change. For instance, if a server load increases, more processing can be pushed to the client device 104. As another example, if the client-side agent 118 detects a high client load, or taxed client resources, less processing can be performed on the client device 104, and a less or non-processed file can be sent to the server 102. As yet another example, if network load or performance degrades, more processing can be performed on the client device 104, so that a smaller (e.g., compressed) file can be sent to the server 102.

Determination of whether to perform client processing and/or how much processing to perform on the client device 104 can be determined at the client device 104 (e.g., by the client-side agent 118), at the server 102 (e.g., by the load processing location selector 116), and/or by a combination of client and server side components. Client and/or server-side components can share information with corresponding client/server counterparts, for example. In some implementations, a collaborative decision is reached, by the client-side agent 118 and the load processing location selector 116 regarding how much processing to offload to the client device 104. In other implementations, the client-side agent 118 or the load processing location selector 116 may have a higher priority for determining how much client-side processing to perform (although a highest priority component (e.g., client or server-based) may still rely on information received from the counterpart client or server component (and on received or determined network bandwidth information).

Various factors can affect decision points for how much and which type of processing to offload to the client device 104. For instance, file size and format, server capacity and load, client capacity and load, and network capacity and load can affect decisions and decision points. Other examples include compression efficiency, for different data sets. For instance, certain data sets may be reduced more, by compression, than other data sets. A data set that has a higher rate of compression may be more likely to have compression done on the client device 104, for example, since a higher compression rate would result in a smaller data transfer size. For a data set that has a lower compression rate, a likelihood of performing compression on the client device 104 may be reduced, since a data transfer size reduction may be less than for data sets that have higher compression. If actual compression efficiency is less than expected compression efficiency, some or all compression may be moved to the server 102. Other dynamic factors can include previous transfer times for previously processed data sets or data set portions.

Compression rates, load factors, and other load processing factors can be monitored dynamically as data is transformed and transferred. Offload decisions can be made or changed per server, per client, per data set, or within a data set, for example. Factors that may affect load processing decisions can be monitored periodically for servers and clients (e.g., every minute, every hour), and/or can be monitored for specific data sets (e.g., before each file load/transfer), or within data sets. For instance, load processing decisions can be performed at each portion of a file (e.g., where a portion may be defined as a file chunk, a table, a certain number of records, or a certain amount of data). For instance, for a first portion of a file, load processing factors may lead to a decision to perform a first set of steps at the client device 104 and a second set of steps at the server 102. For a second portion of the file, load processing factors can be reevaluated, and a determination can be made to perform more (or less) processing at the client device 104, for the second portion. A set of processing steps performed at the client device 104 can be adjusted (e.g., expanded or reduced) for the second portion. Similarly, a set of steps preformed at the server 102 can be adjusted (e.g., expanded or reduced) for the second portion. Similar decisions can be made for remaining portions of the file.

The system 100 may support different types and/or counts of offload modes. For instance, two modes may exist—e.g., a server-based mode where all (or most) processing is performed on the server 102 and a client-based mode where certain steps are performed on the client device 104 (with some steps being performed on the server 102). In other examples, more than two modes can be used, with a sliding scale of how many steps are performed on the client device 104 or the server 102. For instance, load processing for an application, system or data set may include four steps that could either be performed on the client device 104 or on the server 102. Five modes can be supported, in which zero, one, two, three, or four steps are performed on the client device 104. Which mode to use can be determined based on load processing factors, as described above, with a certain mode being selected based on current values of load processing factors. For instance, a first degree of server load may result in selection of a mode in which two of the four processing steps are performed on the client device 104. A second, higher degree of server load may result in selection of a mode in which three of the four processing steps are performed at the client device 104. Different applications, systems, or data sets can have a different number and/or order of load processing steps, and a different number and/or order of load processing steps that may be performable on either the client device 104 or the server 102.

As used in the present disclosure, the term "computer" is intended to encompass any suitable processing device. For example, although FIG. 1 illustrates a single server 102, and a single client device 104, the system 100 can be implemented using a single, stand-alone computing device, two or more servers 102, or two or more client devices 104. Indeed, the server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client device 104 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150 and 152 are used by the client device 104 and the server 102, respectively, for communicating with other systems in a distributed environment—including within the system 100—connected to the network 106. Generally, the interfaces 150 and 152 each comprise logic encoded in software and/or hardware in a suitable combination and operable to communicate with the network 106. More specifically, the interfaces 150 and 152 may each comprise software supporting one or more communication protocols associated with communications such that the network 106 or interface's hardware is operable to communicate physical signals within and outside of the illustrated system 100.

The server 102 includes one or more processors 154. Each processor 154 may be a central processing unit (CPU), a blade, an application specific integrated circuit (ASIC), a field-programmable gate array (FPGA), or another suitable component. Generally, each processor 154 executes instructions and manipulates data to perform the operations of the server 102. Specifically, each processor 154 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 156. In some implementations, the server 102 includes multiple memories. The memory 156 may include any type of memory or database module and may take the form of volatile and/or non-volatile memory including, without limitation, magnetic media, optical media, random access memory (RAM), read-only memory (ROM), removable media, or any other suitable local or remote memory component. The memory 156 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The client device 104 may generally be any computing device operable to connect to or communicate with the server 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 112. A client application is any type of application that allows the client device 104 to request and view content on the client device 104. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 further includes one or more processors 158. Each processor 158 included in the client device 104 may be a central processing unit (CPU), an application specific integrated circuit (ASIC), a field-programmable gate array (FPGA), or another suitable component. Generally, each processor 158 included in the client device 104 executes instructions and manipulates data to perform the operations of the client device 104. Specifically, each processor 158 included in the client device 104 executes the functionality required to send requests to the server 102 and to receive and process responses from the server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a GUI 160.

The GUI 160 of the client device 104 interfaces with at least a portion of the system 100 for any suitable purpose, including generating a visual representation of the client application 112. In particular, the GUI 160 may be used to view and navigate various Web pages, or other user interfaces. Generally, the GUI 160 provides the user with an efficient and user-friendly presentation of business data provided by or communicated within the system. The GUI 160 may comprise a plurality of customizable frames or views having interactive fields, pull-down lists, and buttons operated by the user. The GUI 160 contemplates any suitable graphical user interface, such as a combination of a generic web browser, intelligent engine, and command line interface (CLI) that processes information and efficiently presents the results to the user visually.

Memory 162 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 162 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
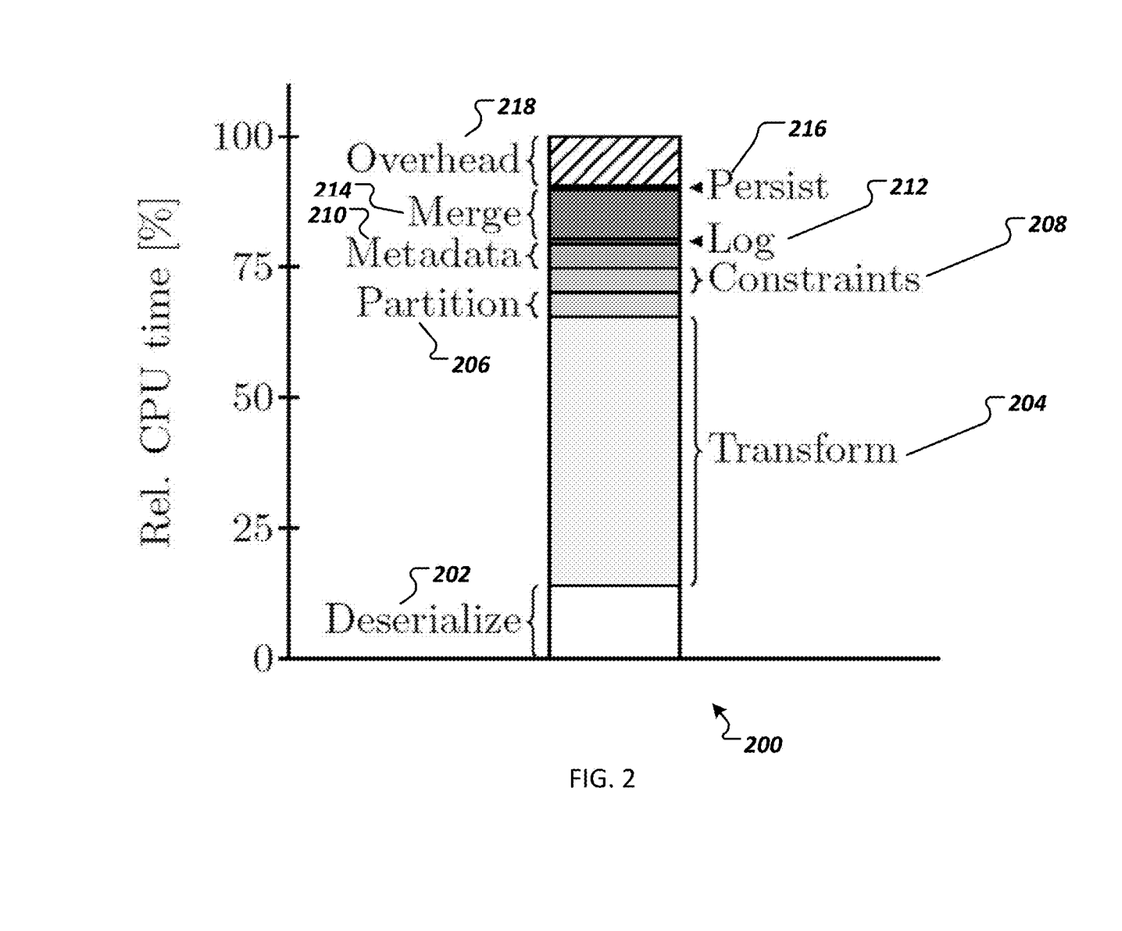
FIG. 2 is an example graph 200 that illustrates processing time for different load tasks.

FIG. 2 is an example graph 200 that illustrates processing time for different load tasks. Load tasks can include, for example, deserializing 202, data transformation 204, table partitioning 206, constraint checks 208, metadata updating 210 (e.g., index updating), logging 212, merging 214, persisting 216, and other overhead tasks 218. The graph 200 illustrates a proportion of load processing time that may typically occur in each of the different load tasks that may be part of a bulk-loading pipeline. The results shown may be typical for systems with complex data transformations and/or for systems with compressed storage.

The deserialization task 202 can include parsing, and validating and creating an instance of a SQL (Structured Query Language) data type in memory. As illustrated, the deserialization task 202 may consume approximately 15% of the overall load processing time. As shown in the graph 200, the data transformation task 204 may consume more than half of the overall loading processing time. Data transformation can include inserting new rows into write-optimized storage, computing a compressed representation using an unsorted dictionary, and create a columnar in-memory representation.

The constraint check task 208, the table partitioning task 206, and the metadata updating task 210 each typically use only a relatively small amount of the overall loading processing time. The merging task 214 can include merging write-optimized storage into read-optimized storage, and can consume approximately 10% of the overall load processing time. The logging task 212 and the persisting task 216 typically consume a negligible amount of the overall load processing time due to asynchronous input/output calls. The remaining 10% of the overall load processing time is typically used by the overhead tasks 218, which can be overhead tasks performed by a transaction manager, such as lock handling and memory management.

The deserialization task 202 and the transformation task 204 can be candidate tasks for offloading to client device(s). The transformation task 204 can provide a greater opportunity for offloading more work from the server than the deserialization task 202, especially for compression-optimized systems. Accordingly, the transformation task 204 may be more likely to be offloaded, or may be offloaded in different situations, based on rules and loading cost factors. A system such as the load sharing system described herein that is configured to take advantage of offloading transformation tasks can achieve more performance improvement than other systems that are configured to only (or mainly) offload deserialization tasks.

Figure 3:
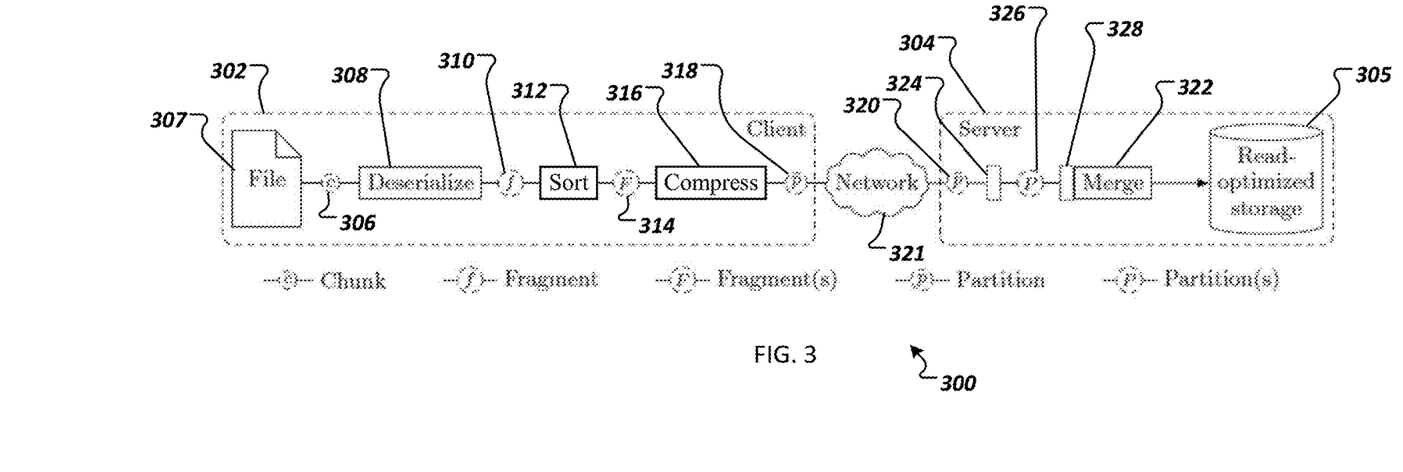
FIG. 3 illustrates an example system in which most load processing is performed on a client device.

FIG. 3 illustrates an example system 300 in which most load processing is performed on a client device 302 (with some load processing being performed on a server 304). The system 300 illustrates (relatively) client-centric bulk loading into optimized storage 305. The client 302 can transform data by pushing file chunks 306 of a file 307 through a processing pipeline. In summary, when data transformations are assigned to the client 302, the client 302 can produce a dictionary-compressed, columnar partition and send the partition to the server 304. The server 304 can merge partitions into the optimized storage 305. Although an example of order-preserving dictionary compression is described, dynamically offloading of other types of compression approaches (or other transformations) may be performed.

In further detail, the file 306 can be a delimiter-separated-values file such as CSV, or another type of format. As part of loading the file 306 from the client 302 to the server 304, various processing steps can be performed. Some steps may be performed on the client 302 and some steps may be performed on the server 304. A client-side or a server-side component can determine which steps are performed on the client 302 and which steps are performed on the server 304. Performing at least some processing on the client 302 can reduce a processing load on the server 304. Additionally, performing at least some processing on the client 302 can reduce an amount of data sent to the server 304. For instance, transformed data may be smaller in size than original data. In the example system 300, most steps are performed on the client 302.

A deserialization step 308 performed on the client 302 can include converting a file chunk 306 from the file 307 to an in-memory instantiation of the file chunk data. The deserialization step 308 can include parsing the chunk 306 to identify delimiter symbols, validating fields, and instantiating data types in memory according to a schema of a target table that the client 302 has received from the server 304. Additionally, the deserialization step 308 can include assembly of all rows of the chunk 306 into a columnar in-memory representation, which can result in creation of a fragment 310.

A sort step 312 can include adding a temporary dictionary to a fragment's column to create a sorted copy of the column without duplicates. The sort step 312 can produce a sorted fragment 314.

A compression step 316 can include assembly of multiple fragments into a horizontal partition 318 and merging of temporary dictionaries of a column into a single dictionary. The compression step 316 can include using the single dictionary to encode the columns of the sorted fragment 314. A transfer step can include sending a partition 320 to the server 304 over a network 321. Client-performed dictionary compression generally results in a reduction of a transfer size as compared to performing compression on the server 304.

The server 302 can be a part of an overall database system (e.g., the server 302 can have internal access to a storage engine and/or the optimized storage 305). When data transformation is shifted to the client 302, the server 302 can receive the partition 320 as a dictionary-compressed, columnar partition that can be directly merged into the optimized storage 305.

For example, a merge step 322 can include merging one or more partitions into the optimized storage 305. For instance, the merge step 322 can include merging of all partitions received since a last merge operation. For each column of the received partition(s), a dictionary of the column can be merged with a corresponding dictionary of the optimized storage 305. The merge step 322 can include creation of mappings from the dictionaries of the received partitions to a new dictionary. The merge step 322 can include using the mappings to update the optimized storage 305 as well as to update the data of the received partitions. Updated partitions can then be appended to the optimized storage 305. In some implementations, data can be merged into a specific partition of a target table, or a new partition can be created to avoid updating the dictionary compression.

Figure 4:
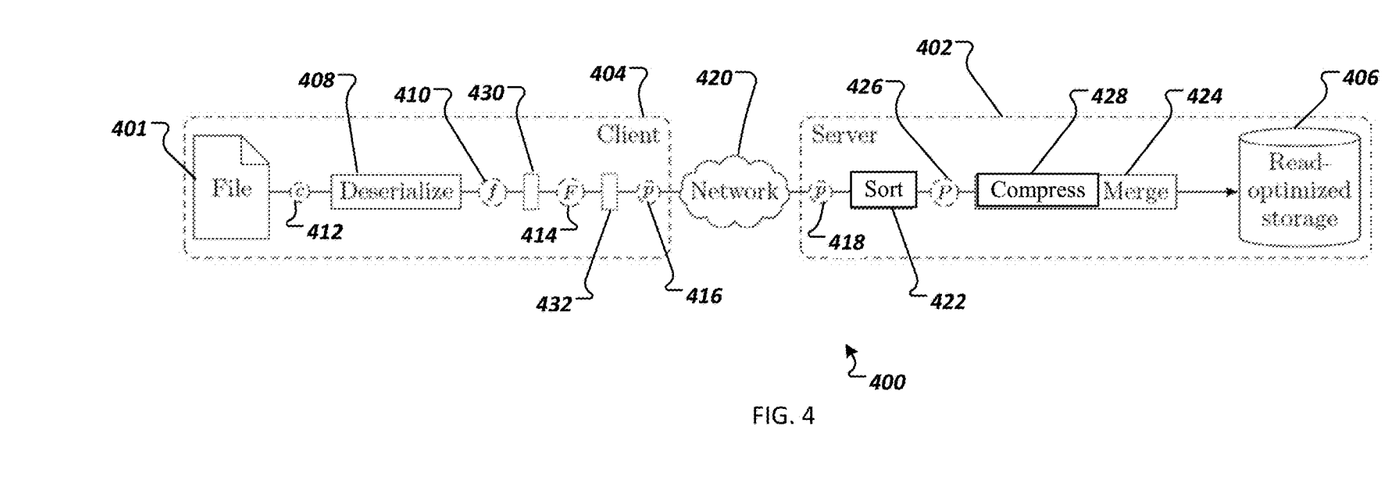
FIG. 4 illustrates an example system in which most load processing of a file is performed on a server.

FIG. 4 illustrates an example system 400 in which most load processing of a file 401 is performed on a server 402 (with some load processing being performed on a client 404). The system 400 illustrates (relatively) server-centric bulk loading into optimized storage 406. In summary, only a deserialization step 408 has been shifted to the client 404, with other data transformations performed on the server 402. With a setup as illustrated in the system 400, the client 404 can generate and send an un-compressed, columnar partition.

For instance, the deserialization step 408 can produce a fragment 410 from a file chunk 412, as described above for a client-centric approach. The client 404 can group multiple fragments 414 into a horizontal partition 416 without applying dictionary compression. The client 404 can transfer a partition 418 to the server 402 by sending multiple fragment over a network 420.

The partition 418 received by the server 402 can be an uncompressed, columnar partition. The server 402 can be configured to transform data of the partition 418 before merging the partition 418 into the optimized storage 406. A sort step 422 on the server 402 can be provided fragments of the partition 418 as fragments are received at the server 402, so that each fragment can be processed independently as soon as a fragment arrives. For each column of a fragment, the sort step 422 can include creation of a temporary dictionary (e.g., similar to the sort step 312 on the client 302).

A merge step 424 can include merging of partitions 426 that have been received since a last merge operation. For each column of the received partitions 426, the merge step 424 can include merging temporary dictionaries with a corresponding dictionary of the optimized storage 406 and mapping the dictionaries of the optimized storage 406 to the merged dictionaries. The server 402 can use the mappings to update the optimized storage 406 and the merged dictionaries. The mappings can also be used to compress the merged partitions (e.g., in a compression step 428). Compressed partitions can then be appended to the optimized storage 406.

As mentioned, some approaches are not strictly client or server centric. For instance, shared loading approaches can include deciding, at load time, whether to transform a fragment's column on a client or on a server. To implement a dynamic load-time decision, load processing rule(s) can be evaluated during a sort step at the client. A client sort step can either include or omit creation of a temporary dictionary. For instance, the sort step 312 in FIG. 3 can include temporary dictionary creation. As another example, a sort step 430 in FIG. 4 can be empty (or include minimal overhead processing) based on a decision to not create a temporary dictionary (e.g., for the file 401 or for a given fragment). The sort step 430 is shown as a "placeholder" step in the example of FIG. 4.

Subsequent steps in a pipeline can adapt to decisions made by previous steps in the pipeline. For instance, the compression step 316 can include compression activities for a fragment, based on the sort step 312 including temporary dictionary creation for the fragment. As another example, a compression step 432 can be configured to compress a fragment's column if the column has a temporary dictionary. If the column does not have a temporary dictionary, the fragment's column can remain uncompressed in the partition 416 (e.g., with compression not being performed, as by the compression step 432 being illustrated in a placeholder style).

A server sort step can create a temporary dictionary for a column only if a fragment's column is not already dictionary-compressed. Accordingly, a server sort step can produce a partition where a fragment's column either is dictionary-compressed or has a temporary dictionary. For example, the sort step 422 at the server 402 can create a temporary dictionary, e.g., if sorting had not been performed on the client 404. As another example, a sort step 324 on the server 304 can forward the partition 320 (e.g., as a partition 326), as a dictionary-compressed partition, due to prior performance of the compression step 316 on the client 302. That is, the sort step 324 can omit sorting, as indicated by the sort step 324 being illustrated in a placeholder style.

A server merge step can either update dictionary compression of a fragment's compressed column or encode a fragment's uncompressed column when writing to optimized storage. For example, the merge step 424 can initiate (e.g. in the compression step 428) encoding of uncompressed columns received from the sort step 422, if compression was not performed on the client 404. As another example, the merge step 322 can include updating of dictionary compression previously performed in the compression step 316 (e.g., without invoking a compression step 328 on the server 304).

Figure 5:
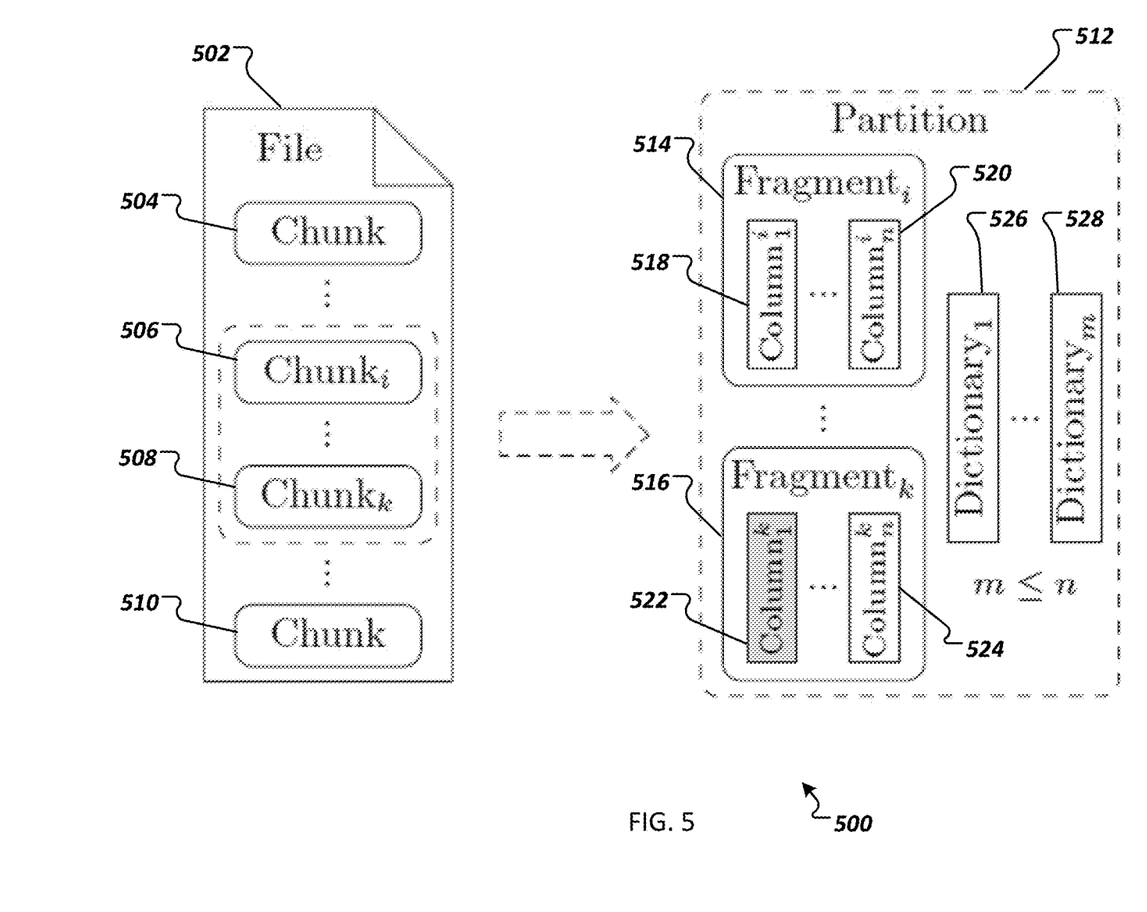
FIG. 5 illustrates an example system for dictionary-compressing fragment data on a client or on a server.

FIG. 5 illustrates an example system 500 for dictionary-compressing fragment data on a client or on a server. A file 502 to be sent to a server can include various chunks 504, 506, 508, and 510. The chunks 504, 506, 508, and 510 can be processed by a deserialization component. Deserialization can be performed on a client and/or on a server. Deserialization can result in fragments. When deserialization is performed on the client, the client can send a partition 512 to the server, that includes multiple fragments (e.g., fragments 514 and 516). The fragments 514 and 516 can each be columnar in-memory fragments that include data for one or more columns. For instance, the fragment 514 includes data for a column 518 and a column 520. Similarly, the fragment 516 includes data for a column 522 and a column 524. The shared loading system can determine whether to transform (e.g., compress) a fragment's column on the client or on the server. For example, the column 522 may have been dictionary compressed using a dictionary 526, on the client. The columns 518, 520, and 524 may not have been dictionary compressed on the client and can be dictionary compressed on the server (e.g., using the dictionary 526 and/or a dictionary 528).

Figure 6:
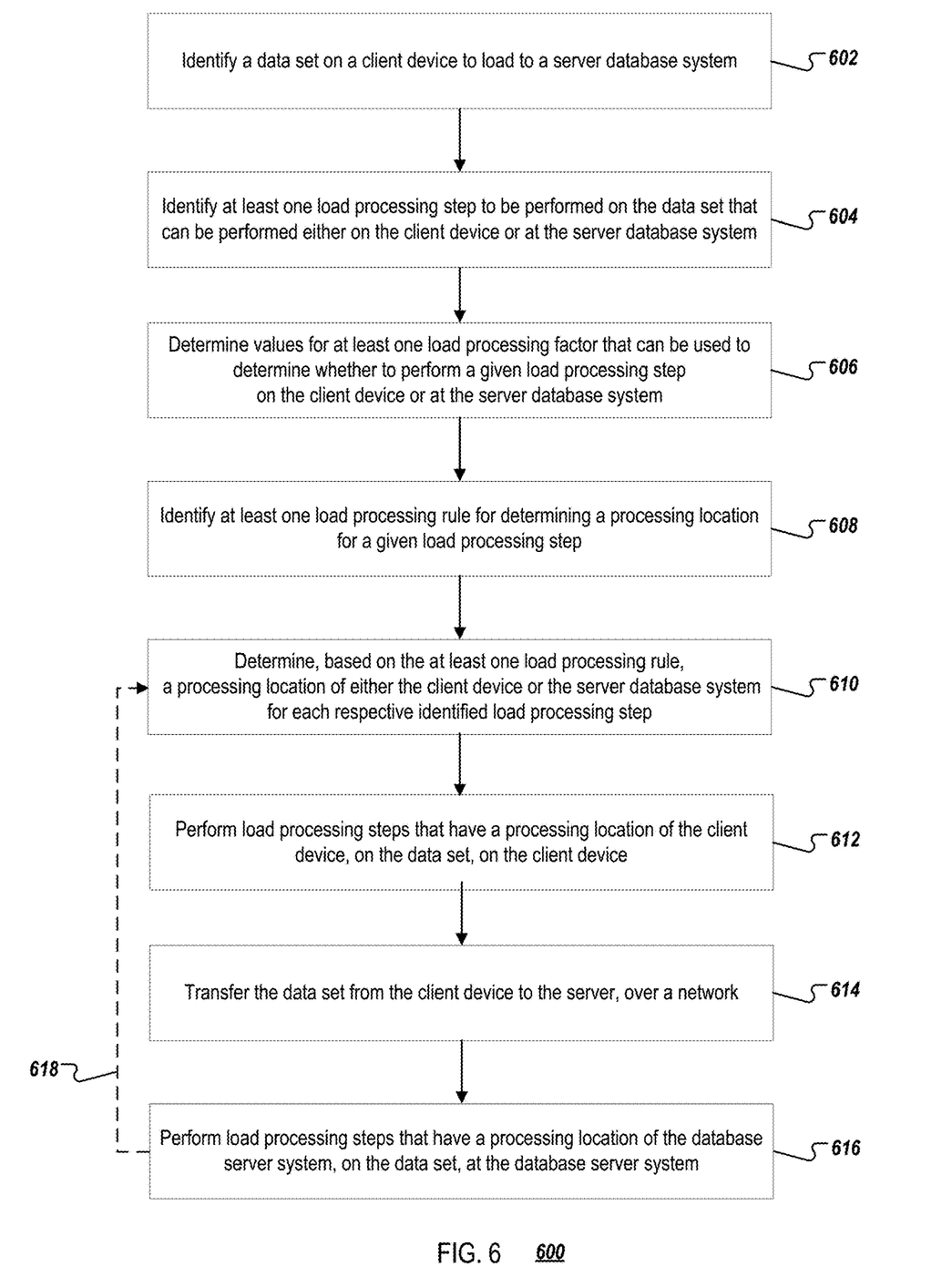
FIG. 6 is a flowchart of an example method for efficient shared bulk loading into optimized storage.

FIG. 6 is a flowchart of an example method 600 for efficient shared bulk loading into optimized storage. It will be understood that method 600 and related methods may be performed, for example, by any suitable system, environment, software, and hardware, or a combination of systems, environments, software, and hardware, as appropriate. For example, one or more of a client, a server, or other computing device can be used to execute method 600 and related methods and obtain any data from the memory of a client, the server, or the other computing device. In some implementations, the method 600 and related methods are executed by one or more components of the system 100 described above with respect to FIG. 1. For example, the method 600 and related methods can be executed by the loader 110 of FIG. 1.

At 602, a data set on a client device to load to a server database system is identified.

At 604, at least one load processing step to be performed on the data set that can be performed either on the client device or at the server database system is identified. Load processing steps can include deserialization, sorting, compression, or merging, or other types of data transformation.

At 606, values for at least one load processing factor are determined. Load processing factors can be used to determine whether to perform a given load processing step on the client device or at the server database system. Load processing factors can include network load, server load, client load, data set size, data set format, or data set target format.

At 608, at least one load processing rule for determining a processing location for a given load processing step is identified. Each load processing rule is based on at least one load processing factor. A load processing rule can include logic and/or conditions, that when evaluated, result in selection of a processing location for one or more load processing steps.

At 610, a processing location for performing a respective load processing step of either the client device or the server database system, is determined, based on the at least one load processing rule, for each respective identified load processing step. The client device or the server database system can determine a processing location for a load processing step. The client device can determine a processing location for a given load processing step based at least in part on data received from the database server system. Similarly, the database server system can determine a processing location for a given load processing step based at least in part on data received from the client device.

A processing location for a given load processing step can be determined for the data set before the data set is processed or for each of multiple portions of the data set. The portions can include one of data for a given table, a given number of records, or a given number of bytes of data.

At 612, when at least one load processing step has a processing location of the client device, the load processing steps that have a processing location of the client device, are performed on the data set, on the client device.

At 614, the data set is transferred from the client device to the server database system, over a network. When load processing steps have been performed on the client device, the transferred data set can be a data set that has been transformed by the client-side load processing steps.

At 616, when at least one load processing step has a processing location of the database server system, the load processing steps that have a processing location of the database server system are performed on the data set, at the database server system. Some server-side processing steps can be performed on the data set, independent of the at least one load processing rule and independent of whether processing has been performed for the data set on the client. For example, server-side processing steps can include an authorization step, a uniqueness check, or a data consistency check that can be generally be performed for data loads. Once load processing has been performed on the server database system, the data set can be loaded into a database of the database server system.

As indicated by an arrow 618 from step 616 to step 610, in some implementations and for some data sets, load processing rules can be reevaluated for subsequent portions of a data set. Accordingly, steps 610 through 616 can be performed in an iterative fashion as part of a feedback loop, in which decisions regarding processing locations for subsequent data set portions can be made based on factors that may correspond to processing of previous data set portions. For instance and as mentioned, a compression rate, processing time, or transfer time may be more or less than initially estimated, or other factors such as system, client, server, or network loads may have changed since initial processing of the data set. Accordingly, at least some updated load processing factors may be obtained during each iteration.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   identifying, in response to a load request, a data set on a client device to load to a server database of a server database system;
   identifying a set of load-processing steps to perform on the data set prior to the data set being loaded to the server database of the server database system;
   identifying, as a subset of the load-processing steps, at least two location-independent load processing steps to be performed on the data set that can be performed either on the client device or at the server database system;
   determining, at least one load processing location factor, wherein at least one load processing location factor is a dynamic load processing location factor that varies with each load request;
   identifying at least one load processing location rule that identifies a processing location to perform a given location-independent load processing step on the data set before the data set is loaded to the server database, wherein each load processing location rule is based on at least one load processing location factor;
   evaluating the at least one load processing location rule to determine (1) a client score associated with performing each location-independent load processing step at the client device and (2) a server score associated with performing each location-independent load processing step at the server database system;
   determining, based on the client score and server score, a processing location of either the client device or the server database system for performing the location-independent load processing step on the data set before the data set is loaded to the server database, wherein the determination includes dynamically determining a processing location of the client device for a first subset of the location-independent load processing steps and dynamically determining a processing location of the server for a second subset of the location-independent load processing steps;
   performing the first subset of the location-independent load processing steps that have a processing location of the client device, on the data set, on the client device;
   transferring the data set from the client device to the server database system over a network; and
   sending information to the database server system to instruct the database server system to perform the second subset of the location-independent load processing steps that have a processing location of the database server system, on the data set, at the database server system, before the data set is loaded to the server database.

2. The method of claim 1, wherein the database server system performs at least one server-side processing step, on the data set, independent of the at least one load processing location rule.

3. The method of claim 2, wherein the at least one server-side processing step includes an authorization step, a uniqueness check, or a data consistency check.

4. The method of claim 3, wherein the database server system loads the data set into the server database of the database server system.

5. The method of claim 1, wherein the location-independent load processing steps include transformation to a target format.

6. The method of claim 5, wherein transformations include deserialization, compression, sorting, or merging.

7. The method of claim 5, wherein the load processing location factors include, data set size, data set format, or data set target format.

8. The method of claim 1, wherein the client device determines a processing location for the given location-independent load processing step based at least in part on data received from the database server system.

9. The method of claim 1, wherein a processing location for a given location-independent load processing step is determined for the data set before the data set is processed.

10. The method of claim 1, wherein a processing location for a given location-independent load processing step is determined for each of multiple portions of the data set.

11. The method of claim 10, wherein the portions include one of data for a given table, a given number of records, or a given number of bytes of data.

12. The method of claim 1, wherein the at least one load processing factor comprises network load, server load, or client load.

13. The method of claim 1, wherein evaluating the at least one load processing location rule comprises evaluating a plurality of load processing location rules, each particular load processing location rule being associated with a rule weight.

14. The method of claim 1, wherein determining, based on the client score and server score, a processing location of either the client device or the server database system for performing the location-independent load processing step on the data set before the data set is loaded to the server database comprises: aggregating client scores from the plurality of load processing location rules based on their associated rule weight; and aggregating server score from the plurality of load processing location rules based on their associated rule weight.

15. A system comprising:
one or more computers; and
a non-transitory computer-readable medium coupled to the one or more computers having instructions stored thereon which, when executed by the one or more computers, cause the one or more computers to perform operations comprising:
identifying, in response to a load request, a data set on a client device to load to a server database of a server database system;
identifying a set of load-processing steps to perform on the data set prior to the data set being loaded to the server database of the server database system;
identifying, as a subset of the load-processing steps, at least two location-independent load processing steps to be performed on the data set that can be performed either on the client device or at the server database system;
determining, at least one load processing location factor, wherein at least one load processing location factor is a dynamic load processing location factor that varies with each load request;
identifying at least one load processing location rule that identifies a processing location to perform a given location-independent load processing step on the data set before the data set is loaded to the server database, wherein each load processing location rule is based on at least one load processing location factor;
evaluating the at least one load processing location rule to determine (1) a client score associated with performing each location-independent load processing step at the client device and (2) a server score associated with performing each location-independent load processing step at the server database system;
determining, based on the client score and server score, a processing location of either the client device or the server database system for performing the location-independent load processing step on the data set before the data set is loaded to the server database, wherein the determination includes dynamically determining a processing location of the client device for a first subset of the location-independent load processing steps and dynamically determining a processing location of the server for a second subset of the location-independent load processing steps;
performing the first subset of the location-independent load processing steps that have a processing location of the client device, on the data set, on the client device;
transferring the data set from the client device to the server database system over a network; and
sending information to the database server system to instruct the database server system to perform the second subset of the location-independent load processing steps that have a processing location of the database server system, on the data set, at the database server system, before the data set is loaded to the server database.

16. The system of claim 15, wherein the database server system performs at least one server-side processing step, on the data set, independent of the at least one load processing location rule.

17. The system of claim 16, wherein the at least one server-side processing step includes an authorization step, a uniqueness check, or a data consistency check.

18. A computer program product encoded on a non-transitory storage medium, the product comprising non-transitory, computer readable instructions for causing one or more processors to perform operations comprising:
identifying, in response to a load request, a data set on a client device to load to a server database of a server database system;
identifying a set of load-processing steps to perform on the data set prior to the data set being loaded to the server database of the server database system;
identifying, as a subset of the load-processing steps, at least two location-independent load processing steps to be performed on the data set that can be performed either on the client device or at the server database system;
determining, at least one load processing location factor, wherein at least one load processing location factor is a dynamic load processing location factor that varies with each load request;
identifying at least one load processing location rule that identifies a processing location to perform a given location-independent load processing step on the data set before the data set is loaded to the server database, wherein each load processing location rule is based on at least one load processing location factor;
evaluating the at least one load processing location rule to determine (1) a client score associated with performing each location-independent load processing step at the client device and (2) a server score associated with performing each location-independent load processing step at the server database system;
determining, based on the client score and server score, a processing location of either the client device or the server database system for performing the location-independent load processing step on the data set before the data set is loaded to the server database, wherein the determination includes dynamically determining a processing location of the client device for a first subset of the location-independent load processing steps and dynamically determining a processing location of the server for a second subset of the location-independent load processing steps;

performing the first subset of the location-independent load processing steps that have a processing location of the client device, on the data set, on the client device;

transferring the data set from the client device to the server database system over a network; and sending information to the database server system to instruct the database server system to perform the second subset of the location-independent load processing steps that have a processing location of the database server system, on the data set, at the database server system, before the data set is loaded to the server database.

19. The computer program product of claim 18, wherein the database server system performs at least one server-side processing step, on the data set, independent of the at least one load processing location rule.

20. The computer program product of claim 19, wherein the at least one server-side processing step includes an authorization step, a uniqueness check, or a data consistency check.

\* \* \* \* \*